United States Patent
Blank et al.

(10) Patent No.: US 6,512,620 B1
(45) Date of Patent: Jan. 28, 2003

(54) OPTICAL TRANSMISSION DEVICE

(75) Inventors: Jürgen Blank, Berlin (DE); Volker Plickert, Brieselang (DE); Torsten Wipiejewski, Regensburg (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/395,003

(22) Filed: Sep. 13, 1999

(30) Foreign Application Priority Data

Sep. 16, 1998 (DE) .......................... 198 43 206

(51) Int. Cl.[7] .............................................. H04B 10/04
(52) U.S. Cl. ...................................... 359/180; 372/29.02
(58) Field of Search ............................... 359/180, 187; 372/29.02, 31, 33

(56) References Cited

U.S. PATENT DOCUMENTS

| | | | | |
|---|---|---|---|---|
| 4,926,429 A | * | 5/1990 | Chung | 372/32 |
| 5,414,280 A | * | 5/1995 | Girmay | 257/80 |
| 5,974,064 A | * | 10/1999 | Uchida | 372/38 |
| 6,137,814 A | * | 10/2000 | Brosson et al. | 372/28 |
| 6,263,487 B1 | * | 5/2001 | Stephens | 359/161 |
| 6,268,945 B1 | * | 7/2001 | Roberts | 359/161 |
| 6,317,249 B1 | * | 11/2001 | Nakamoto et al. | 359/279 |
| 6,333,805 B1 | * | 12/2001 | Kamata | 359/239 |

FOREIGN PATENT DOCUMENTS

| | | |
|---|---|---|
| DE | 33 33 247 A1 | 3/1985 |
| DE | 36 08 930 A1 | 9/1987 |
| DE | 35 08 034 C2 | 6/1988 |
| DE | 32 07 741 C2 | 4/1989 |
| DE | 40 01 898 A1 | 8/1990 |
| DE | 40 30 995 A1 | 1/1992 |
| DE | 42 27 097 A1 | 2/1994 |
| DE | 42 27 098 A1 | 2/1994 |
| DE | 43 16 811 A1 | 11/1994 |
| EP | 0 539 038 B1 | 4/1999 |
| GB | 2 276 493 A | 9/1994 |

OTHER PUBLICATIONS

International Patent Application WO 93/13576 (Odagawa), dated Jul. 8, 1993.

* cited by examiner

*Primary Examiner*—John A. Tweel
(74) *Attorney, Agent, or Firm*—Laurence A. Greenberg; Werner H. Stemer; Gregory L. Mayback

(57) ABSTRACT

A transmission device contains a plurality of laser transmitters that can be driven individually with a driving current and output optical signals and whose operating point is set via a respective bias current. Each bias current has an individual correction current impressed on it. The correction currents are dimensioned such that, for the same bias current, the laser transmitters have an identical or essentially more uniform average optical output power at the desired operating point.

4 Claims, 2 Drawing Sheets

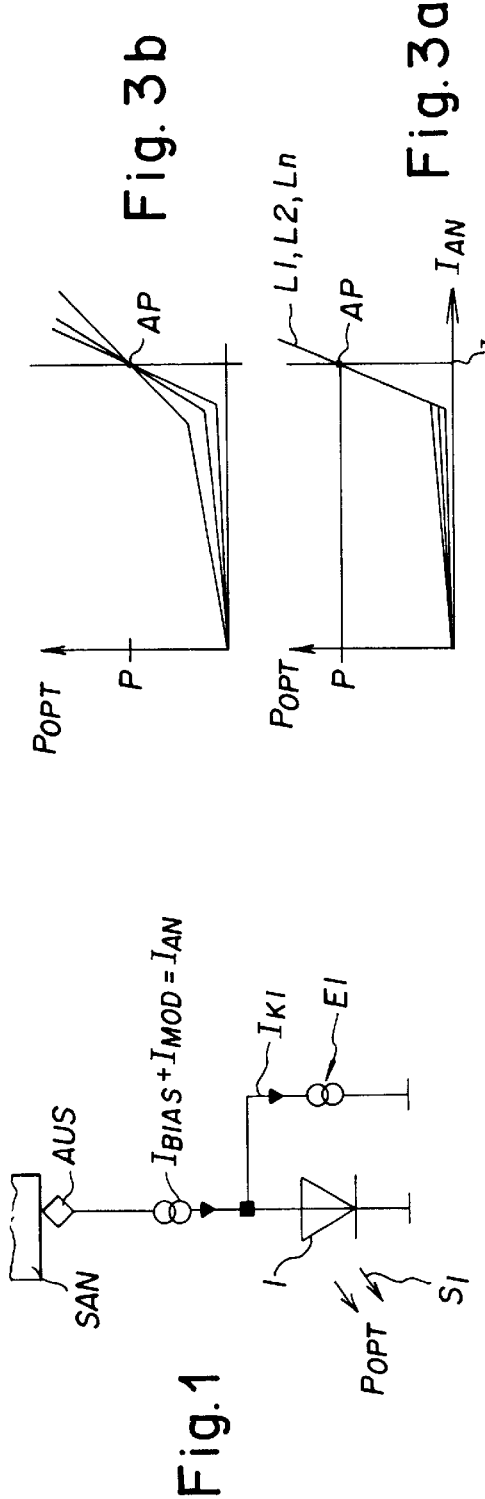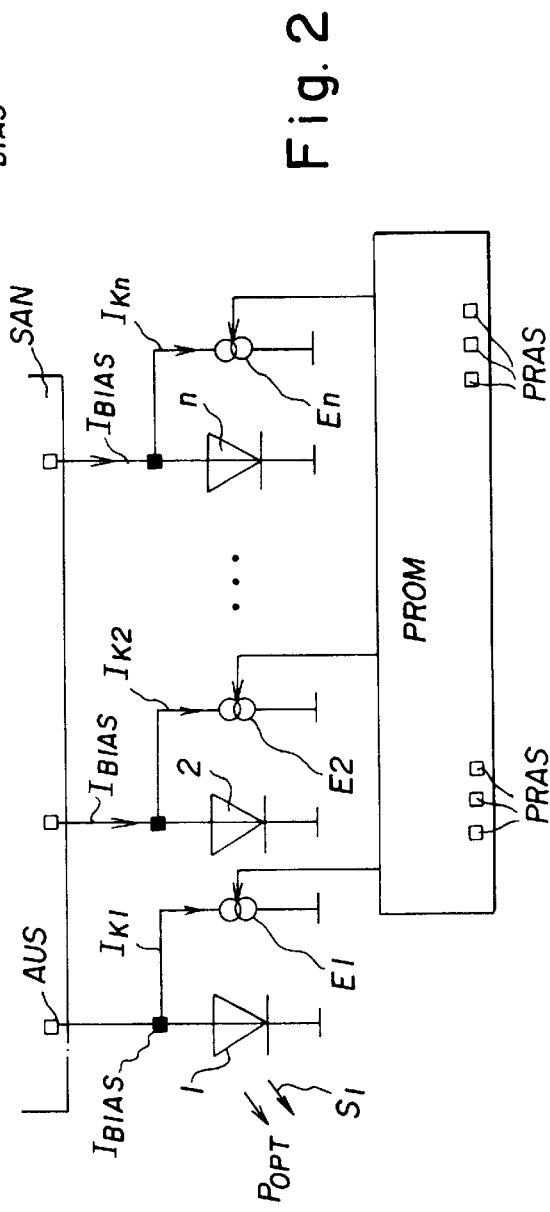

OPTICAL TRANSMISSION DEVICE

BACKGROUND OF THE INVENTION

Field of the Invention

The invention relates to the field of multi-channel optical data transmission using an optical transmission device with a plurality of parallel transmitters and, accordingly, a plurality of optical transmission media, for example optical fibers, which are connected to the transmission device and can preferably be combined to form an optical fiber strip. The invention relates to an optical transmission device having a plurality of laser transmitters that can be driven individually with a driving current to output optical signals and which have a bias current applied to them.

In such an optical transmission device, which is known from International Patent Application WO 93/13576, a plurality of individual laser diodes are disposed together as a so-called laser array and can be electrically driven individually for optical data transmission. The individual laser diodes are driven by a total current that is composed of a bias current and an individual modulation current. The bias current depends on the respective individual diode threshold current and is used to define the average optical output power, i.e. the bias current is used virtually to define the operating point of the respective laser diode. The actual data transmission, i.e. the generation of optical useful power to produce optical useful signals (for example in the form of laser pulses), is effected by superimposing the modulation current (current for producing the modulation shift) on the bias current.

The known transmission device is provided with a control loop which controls the bias current for all the laser diodes together such that the useful power of the laser diodes is kept as constant as possible. In this case, all the diodes have the same bias current applied to them. However, the control loop can be used to compensate only for influences acting on all the laser diodes in the same way or which have the same magnitude and can thus be balanced out by a common controller.

The laser diodes, which are usually produced from a common starting material, are generally situated on a common support, so that the discrepancy in their characteristic data is relatively small, and external influences (e.g. temperature) have roughly the same effect on all the laser diodes.

In practice, particularly with radio-frequency data transmission, the capacity of a parallel transmission device depends, to a not inconsiderable degree, on the similarity (uniformity) of the parameters of the individual diodes. Thus, the optical output power of the individual laser diodes can vary on account of inhomogeneous power parameters (e.g. different diode threshold currents), when all the diodes have the same current level applied to them. A small variation in the optical output power of the individual diodes in a parallel transmission device is tolerated; however, the diodes must then be preselected in this regard, which generally reduces the yield of laser arrays that can be used.

Published, British Patent Application GB 2 276 493-A discloses the simultaneous production of a multiplicity of individual laser units each with a laser transmitter, a monitor diode and a lens. In this case, a multiplicity of lasers in the form of a laser array and a corresponding multiplicity of monitor diodes and lenses are in each case firstly positioned and fixed relative to one another, with high precision, on a common substrate. The assembly is then split up to form respective individual laser units having a respective single laser transmitter. The problems related to different characteristic curves for the lasers in the (initially common) array do not, therefore, arise in operational use.

SUMMARY OF THE INVENTION

It is accordingly an object of the invention to provide an optical transmission device which overcomes the above-mentioned disadvantages of the prior art devices of this general type, which, with the power parameters of the individual laser transmitters being essentially inhomogeneous, still has a homogeneous power spectrum for the laser transmitters.

With the foregoing and other objects in view there is provided, in accordance with the invention, an optical transmission device, including a plurality of laser transmitters each to receive and be driven individually by a driving current including a bias current and each outputting optical signals, the bias current for each of the plurality of laser transmitters having an individual correction current impressed on it and the individual correction current dimensioned such that, for a common bias current the plurality of laser transmitters have a uniform average optical output power at an operating point.

The invention achieves this object with a transmission device of the type mentioned in the introduction in that each bias current has an individual correction current impressed on it, and in that the correction currents are dimensioned such that, for the same bias current, the laser transmitters have a uniform average optical output power at the operating point.

An essential aspect of the invention is the acceptance of a considerable inhomogeneity in the optical output powers of the individual laser transmitters, by each laser transmitter being operated with an individual total bias current. This total bias current can be composed of a bias current, which is the same for all the laser transmitters, and the individual correction current, which is superimposed on the bias current. According to the invention, the correction currents are set such that, at the operational operating point, the laser transmitters have roughly the same driving-current/power characteristic curve and thus have a considerably more uniform average optical output power than in the uncorrected situation.

A significant advantage of the invention, therefore, is that it is also possible to use laser transmitter configurations for optical transmission devices whose individual laser transmitters have considerable inhomogeneity in their power characteristic curves. Individual tuning by setting the correction current can tune all the laser transmitters to the same optical output power (uniform power response).

In one embodiment of the transmission device according to the invention that is preferred in practice, a correction current source associated with the respective laser transmitter supplies the respective individual correction current. The respectively associated correction current source can preferably be produced by a resistor connected in parallel with the diode element. With particular preference, however, the respective tuning can also be carried out by externally programming the respective individual drive circuit. To this end, an externally accessible memory device can be provided which stores the necessary correction current setting in the form of a correction value or setting value individually for each laser transmitter. The correction value is used to set the size of the respective correction current, which is then generated by a current source, for example.

In terms of circuitry, it is preferable for the correction current sources and a device for defining the individual correction currents to be constituent parts of a circuit for individually driving the laser transmitters.

In a preferred development of the invention, the correction current sources and a device for defining the individual correction currents are disposed on a support that also holds the laser transmitters. This embodiment is particularly advantageous, in terms of production, because the correction devices can be easily adjusted if the laser transmitter configuration is modified, and the correction currents can be set independently of the rest of the constituent parts of the transmission device.

Other features which are considered as characteristic for the invention are set forth in the appended claims.

Although the invention is illustrated and described herein as embodied in an optical transmission device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic circuit diagram of a laser transmitter in an optical transmission device according to the invention;

FIG. 2 is a circuit diagram of the transmission device;

FIGS. 3a and 3b are graphs of characteristic curves for the laser transmitters for the transmission device;

DESCRIPTION OF THE PREFERRED EMBODIMENTS

Figure 5:
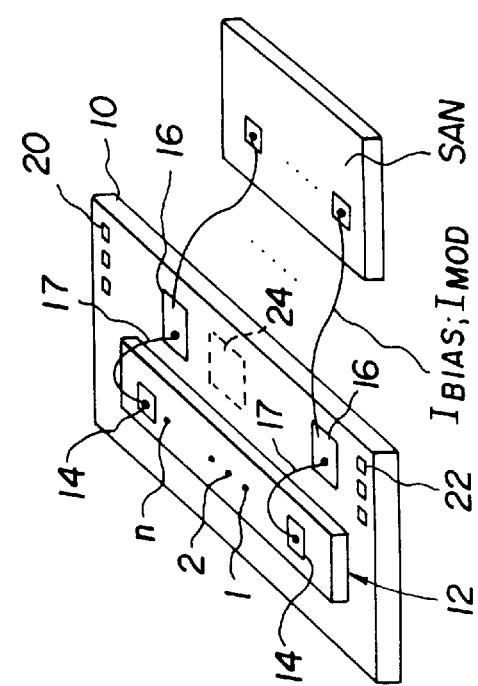
FIG. 5 is a perspective view of a configuration option for the transmission device according to the invention.

In all the figures of the drawing, sub-features and integral parts that correspond to one another bear the same reference symbol in each case. Referring now to the figures of the drawing in detail and first, particularly, to FIG. 1 thereof, there is shown a detail from an optical transmission device according to the invention, only one of whose plurality of transmitters is shown in this case. A transmitter 1 is formed by a laser diode 1, for example, which outputs optical signals S1 having an optical power $P_{OPT}$ when it is electrically driven with a (resultant) driving current $I_{AN}$. The operating point of the transmitter 1 is set by a bias current $I_{BIAS}$, and the actual modulation shift is effected by a modulation current $I_{MOD}$. The sum of the bias current and the modulation current gives the driving current $I_{BIAS}+I_{MOD}=I_{AN}$. The average value $\bar{I}_{AN}$ of the driving current is $\bar{I}_{AN}=I^{BIAS}$ when $\bar{I}_{MOD}=0$. The driving current is generated, for example, by an output AUS of a drive circuit SAN (not shown in more detail) on the basis of data to be transmitted. Since the generation and application of a modulation current is known per se (e.g. from International Patent Application WO 93/13576), only those aspects of the bias current which are essential to the invention are discussed in detail below.

The bias current IBIAS has as shown schematically in FIG. 1 an individual correction current IK1 impressed on it. The correction current is supplied by a correction current source E1 associated with the laser transmitter 1. To set the respective individual correction current IK1, a correction current setting circuit is used. This can be a digitally programmable current source E1 in a path connected in parallel with the laser transmitter 1, for example, as shown schematically in FIG. 1. Depending on the programming selected, the size of the correction current IK1 is thus increased or reduced.

As shown in the schematic illustration of the transmission device according to the invention in FIG. 2, a plurality of laser transmitters 1, 2, ..., n are provided which are individually suitable for outputting optical signals (e.g. S1). As explained in connection with FIG. 1, the operating points of the laser transmitters 1, 2, ..., n are each set individually by superimposing individual correction currents $I_{K1}, I_{K2}, I_{Kn}$ on the common bias current $I_{BIAS}$. For this, the individual correction currents are dimensioned, by appropriately configuring the respective setting device for the correction current sources E1, E2, En, such that the laser transmitters 1, 2, n have an extremely identical (uniform) average optical output power for the same bias current $I_{BIAS}$ in each case (FIGS. 3a and 3b). The correction current sources can be set individually by a programming device PROM, which sets the respective correction current and supplies the correction current sources on the basis of a memory range which can be accessed via programming contact connections $P_{RAS}$.

If the individual correction currents are set appropriately, the characteristic curves L1, L2, Ln shown schematically in FIGS. 3a and 3b are produced for the driving current $I_{AN}$ and the respective power $P_{OPT}$. As FIG. 3a indicates for the three laser transmitters 1, 2, n shown by way of example in FIG. 2, the driving-current/power characteristic curves L1, L2, Ln for the individual laser transmitters are of approximately identical shape. In this example, the characteristic curves for the laser transmitters 1, 2, n have the same differential efficiency (gradient of the characteristic curve). FIG. 3b shows the situation, by way of example, when the differential efficiency varies. In this case, the individual correction currents for the operating point AP—i.e. the range of average operating output power—ensure that the individual output powers P are uniform at the operating point AP. The correction currents therefore bring the operating point AP for all the laser transmitters more into line with one another.

Figure 4:
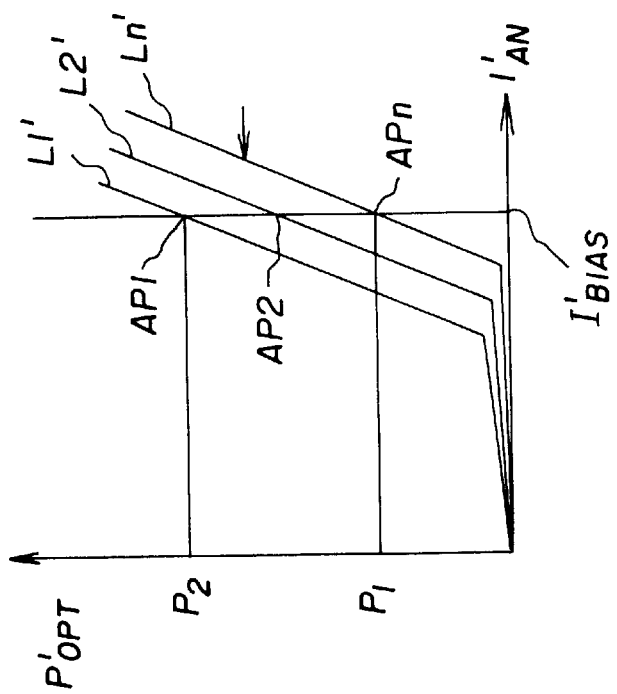
FIG. 4 is a graph of characteristic curves for a conventional prior art transmission device.

By contrast, FIG. 4 shows the state without current correction according to the invention and, in this case, considerable discrepancies in the individual characteristic curves L1', L2', Ln' at the operating point ($AP_1 \ldots AP_n$). The inhomogeneity which can be seen here results in considerable differences in the average optical output powers of the individual laser transmitters for the same driving current $I'_{BIAS}$. Ideal laser transmitters would generate identical output powers $P'_{OPT}$ for the same driving current. In actual fact, the output powers of the individual laser transmitters vary within a considerable range DP=P2−P1, however. This is a result of the driving-current/power characteristic curves L1', L2', Ln' being significantly different from one another (FIG. 4) in terms of threshold current and possibly gradient (although the latter is not shown in FIG. 4).

FIG. 5 shows an embodiment option for the optical transmission device according to the invention. An array 12 having a multiplicity of the individual laser transmitters 1, 2, ..., n is mounted on a common support 10. As illustrated by way of indication, the individual laser transmitters 1, 2, ..., n are connected to a correction device integrated in the support 10 via connection contact faces 14, 16 and bonding wires 17. The driver module SAN modulates electrical input signals in a manner known per se such that a respective modulation current $I_{MOD}$ (modulation shift) is produced which excites the individual lasers to emit light pulses as appropriate. The support 10 has further contact faces 20, 22, which are connected to a memory device 24 integrated in the support. The contact faces 20, 22 can be used to write individual setting values to the memory device 24, the setting values, for their part, dimensioning the respective individual correction current.

We claim:

1. An optical transmission device, comprising:
   a plurality of laser transmitters each to receive and be driven individually by a driving current including a bias current and each outputting optical signals, the bias current for each of said plurality of laser transmitters having an individual correction current impressed on it and the individual correction current dimensioned such that, for a common bias current said plurality of laser transmitters have a uniform average optical output power at an operating point.

2. The transmission device according to claim 1, including a plurality of correction current sources supplying each of said plurality of laser transmitters with a respective individual correction current.

3. The transmission device according to claim 2, including a device controlling said plurality of correction current sources for defining individual correction currents, said device and said plurality of correction current sources are constituent parts of a circuit for individually driving said plurality of laser transmitters.

4. The transmission device according to claim 2, including:
   a device controlling said plurality of correction current sources for defining individual correction currents; and
   a support holding said plurality of laser transmitters, said device and said plurality of correction current sources.

* * * * *